US006562422B1

(12) United States Patent
Hong et al.

(10) Patent No.: US 6,562,422 B1
(45) Date of Patent: May 13, 2003

(54) POLYMER FOR OPTICAL COMPENSATORY FILMS FOR DISPLAY PANELS

(75) Inventors: Shinn Ted Hong, Hsinchu (TW); Hui Lung Kuo, Taipei (TW); Chein Dhau Lee, Hsinchu Hsien (TW)

(73) Assignee: Industrial Technology Research Institute, Hsinch (TW)

( * ) Notice: Subject to any disclaimer, the term of this patent is extended or adjusted under 35 U.S.C. 154(b) by 59 days.

(21) Appl. No.: 09/715,191

(22) Filed: Nov. 20, 2000

(30) Foreign Application Priority Data

Aug. 3, 2000 (TW) ........................ 89115596 A

(51) Int. Cl.$^7$ ........................ C09K 19/00; C07C 35/22; C07C 13/28
(52) U.S. Cl. ........................ 428/1.2; 568/818; 585/352
(58) Field of Search ................. 252/299.01; 528/125, 528/128, 171–175, 179, 183, 185, 188, 220, 229, 350–351, 353; 428/1.1–1.21; 568/818; 585/352

(56) References Cited

U.S. PATENT DOCUMENTS 6,054,554 A * 4/2000 Choi et al. .................. 528/353

OTHER PUBLICATIONS

Hsiao, Sheng–Huei and Chin–Tang Li; "Synthesis and Characterization of New Adamantane Based Polyimides"; Macromolecules, 1998, 31, 7213–7217.*

* cited by examiner

Primary Examiner—Mark F. Huff
Assistant Examiner—Jennifer R. Sadula
(74) Attorney, Agent, or Firm—Birch, Stewart, Kolasch & Birch, LLP

(57) ABSTRACT

The invention provides a polymer for optical compensatory films for display panels. The repeating unit of the polymer contains the derivitives of 2,2-Bis-(4-aminophenyl) adamantane). The structure of the monomer is not polar and it is able to straighten and harden the structure of the polymerized high molecular polymers and it exhibits excellent transmittance. The polymer is obtained by introducing 2,2-Bis-(4-aminophenyl)adamantane) in a high molecular chain.

12 Claims, No Drawings

POLYMER FOR OPTICAL COMPENSATORY FILMS FOR DISPLAY PANELS

BACKGROUND OF THE INVENTION

1. Field of the Invention

The invention relates to a polymer for optical compensatory films, particularly to the material for optical compensatory films for display panels.

2. Description of the Prior Art

In recent times, with the rapid development of portable computers, the improvement of display panels has focused on the need for smaller sizes and lighter weights. Liquid Crystal Display, LCD, having characteristics of low voltage use, low power consumption, portability, compactness, high quality and mass productability, has become the most promising choice and is expansively used in digital watches, calculators, notebooks and other types of computer products.

Presently, LCD devices provide high quality images, yet the image becomes worse when looking at the panel at an angle. This problem results from the birefringence effect induced by the anisotropic liquid crystal. Owing to the positive birefringence of liquid crystal, i.e. the extraordinary refractive index ($n\perp$) is greater than the ordinary refractive index ($n\|$), the light passing by is phase retarded, which in turn induces the above problem when looking at the display panel at an angle. With the increasing size of LCD devices, the above problems could get even worse. Hence, a method to obtain a wide viewing angle effect has become the most important breakthrough in this field.

The improvement of viewing angle problems can be attained in a few different ways. For example, U.S. Pat. No. 5,774,179 proposed a method using electrodes to resolve the viewing angle problem, but the method has not effectively been used due to its high production cost and complex manufacturing processes.

Moreover, U.S. Pat. No. 5,416,621 uses ferroelectric liquid crystal to improve the viewing angle of the LCD. Although ferroelectric liquid crystal itself has the advantage of a wide viewing angle, there are still difficulties in mass production. The same is true of U.S. Pat. No. 5,781,267.

In addition, U.S. Pat. No. 5,689,322 discloses a method of partioning a liquid crystal display device into dozens of different areas, and by adjustment during the process, the alignment layer and liquid crystal are arranged to display different directions and pretilt angles. The method does not require any new material, but a few more steps are needed in the manufacturing process, consequently the production cost is increased.

Another important wide viewing angle technology is adhering a wide viewing angle film onto the display panels. In contrast to LCDs, the adhered film is birefringent and is able to achieve optical symmetry and obtain the results of compensation and colouring. No alterations for the manufacture of LCD devices is needed to apply this method, simply by adding a thin film, the viewing angle problem can be solved. Materials used in this method are mainly liquid crystal polymers (LCPs) disclosed in U.S. Pat. No. 5,883,685, photo-sensitive liquid crystal in U.S. Pat. No. 5,800,733, or polyimide in U.S. Pat. No. 5,344,916. Problems such as difficult manufacturing process and coating technique of LCPs and photo-sensitive liquid crystal have made this method unacceptable. Hence polyimide becomes the most important material that is commercially viable. Dissolubility, rigidity and transmittance of polyimide need to be taken into account to be commercially viable. At the moment, suitable material has not been discovered, therefore the invention tries to solve this problem and provide an applicable material for wide viewing angle technology.

SUMMARY OF THE INVENTION

The object of the invention is, to solve the above-mentioned problems and to provide a polymer for optical compensatory films, which has a wide viewing angle and can be used in display panels.

Another object of the invention is to provide a polymer of negative birefringence films having good coating properties, stability and is applicable to any display panels.

Another object of the invention is to provide a polymer of optical compensatory films that is able to counteract the birefringence effect of LCDs and obtain optically balanced characteristics. The high demands of the high transmittance are also met.

Moreover, an object of the invention is to provide a polymer which is able to give LCDs a wide viewing angle effect, and the polymer can be manufactured by common addition polymerization or reduction methods. This is in accordance with the requirement to be commercially viable.

Another object of the invention is to provide a polymer which is able to give LCDs a wide viewing angle effect, and the polymer can be coated on the LCDs by conventional coating machines, such as scrapper coating, spinning coating, etc.

DETAILED DESCRIPTION OF THE INVENTION

To achieve the above-mentioned object, the polymer of the optical compensatory films of the invention comprises derivatives of an aliphatic cyclic monomer 2,2-Bis-(4-aminophenyl)adamantane) with high transmittance, shown as formula I:

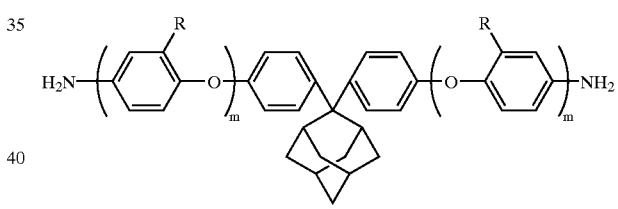

formula I (wherein R represents alkyl or alkyl fluoride of 1 to 5 carbon atoms, such as H, $CH_3$ or $CF_3$ etc.; and m is 0, 1 or 2). The monomer is not a polar structure, and it hardens the high molecular polymer, which consequently attains good transmittance. The high molecular polymer of the invention is obtained by inserting the derivatives of monomer 2,2-bis(4-aminophenyl)adamantane in high molecular chains.

The invention is based on the theory that the rigid structure of the obtained high molecular polylmer, when forming films by coating or alignment agents, is able to produce a regular arrangement. Hence with appropriate thickness and the refractive index being different, i.e., d and Δn, the required phase retardation is achieved. An optical compensation effect is accomplished by exactly counteracting the negative birefringence of the film and the positive birefringence of the LCD. This results in good display quality when viewing from various angles, and the display contrast would not be diminished.

Factors affecting optical compensatory films are, for example, phase retardation, coating properties and transmittance, which are closely related to the structure and manufacturing process of the films. In terms of optics, phase retardation is the most critical because a wide angle viewing effect is only achieved when there is compensation between the film and the LCD. With regards to coating property, it affects the uniformity of film thickness and occurance of pinholes. If the thickness is not constant or having pinholes, the display quality, such as viewing angle and colouring of the LCD would be affected. The minimal acceptable transmittance is 92%.

For the purpose of controlling factors, such as film thickness, organic solvents may be used to adjust the viscosity of the polymer of the invention. Organic solvents preferably are N-Methyl Pyrrolidone; (NMP)·m-Cresol ,r-butylacetone·N,N-dimethylacetamide; (DMAc)·N-N-dimethyl formamide; (DMF)·Ethylene glycol monobutyl ether; (BC)·Diethylene glycol monoethyl ether; (EC) ,o-Chlorobenzene and Chloroform. The amount of BC and EC solvents must be below 90wt % and they must coexist with other solvents. Solid content of the polymer, i.e. the weight percent of the polymers with respect to solvents is preferably between 10% and 30%. After the reaction, solid content should be altered to 5~15% for the purpose of adjusting or diluting the viscosity of the polymer to control factors such as film thickness, etc.

Reaction time for the polymerization is between 3 minutes to 72 hours, preferably 10 minutes to 12 hours. Temperature of reaction is −20 to 180° C., preferably 10 to 60° C.

Cataylst may be added to increase the degree of polymerization and decrease the reaction time. Preferable catalysts are, for example, triethyl amine (TEA), diethyl amine, n-butyl amine (BuA) and pyridine, etc. The reason being that the value of pH can be adjusted and it acts as a catalyst to increase the degree of polymerization and viscosity and decrease the reaction time.

With the test of phase retardation and the coating procedure of wide viewing angle films, that the wide viewing angle films of the invention are suitable for LCDs can be verified. To manufacture wide viewing angle films, the high molecular material of the invention is coated on a substrate by scrapper or spinning, then it is prebaked, postbaked and cooled. The substrate is selected from TAC film, Polarizer or glass. The test of phase retardation is able to examine the properties of wide viewing angle films under different structures and thicknesses. If the properties of the films complement that of the LCDs under various wavelengths, the films are proven to be suitable. It also suggests that the formula of the invention is designed specifically for display panels.

The followings are a few examples of the polymers of the invention, such as polyimide, polyamide imide and polyamide.

Polyimide (shown in formula II):

formula II

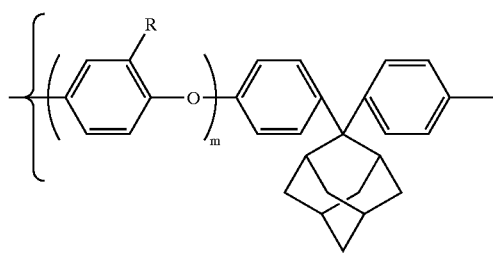

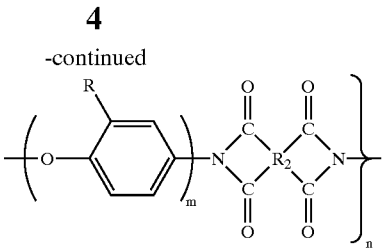

wherein R represents alkyl of 1 to 5 carbon atoms or alkyl fluoride of 1 to 5 carbon atoms, such as H, $CH_3$ and $CF_3$, etc., and m is 0,1 or 2.

Polyimide is the product of reacting 2,2-Bis-(4-aminophenyl)adamantane) (formula I) as diamine with dianhydride. Dianhydride is selected from the group comprising aromatic dianhydride and aliphatic dianhydride, such as:

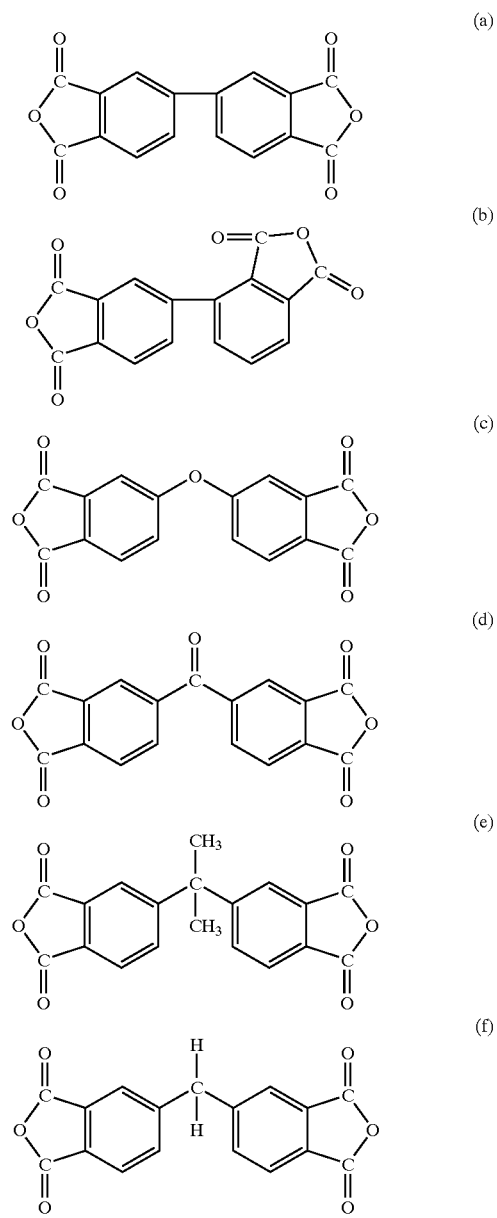

-continued
(g)
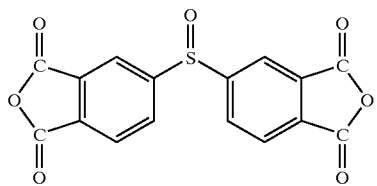
(h)
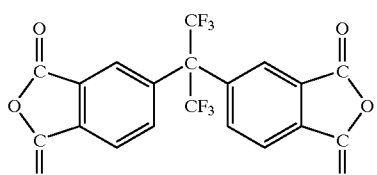
(i)
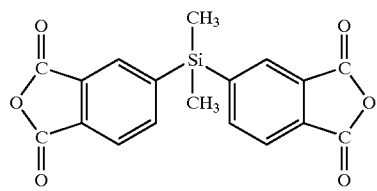
(j)
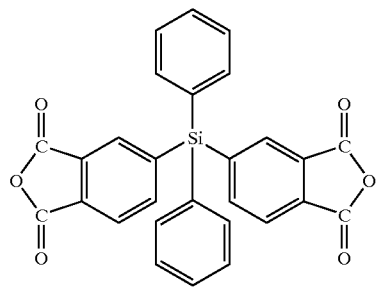
(k)
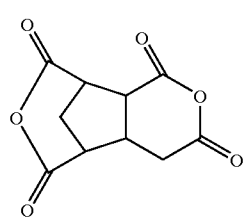
(l)
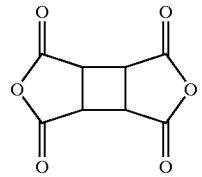
(m)
(n)
(o)
(p)
Polyamide imide, is shown in formula III:
formula III (wherein R represents alkyl of 1 to 5 carbon atoms or alkyl fluoride of 1 to 5 carbon atoms, such as H, CH₃ and CF₃, etc., and m is 0,1 or 2). It is the product of reacting 2,2-Bis-(4-aminophenyl)adamantane) (formula I) as diamine with acid anhydride. Acid anhydride is selected from the group comprising aromatic acid anhydride and aliphatic acid anhydride, such as:
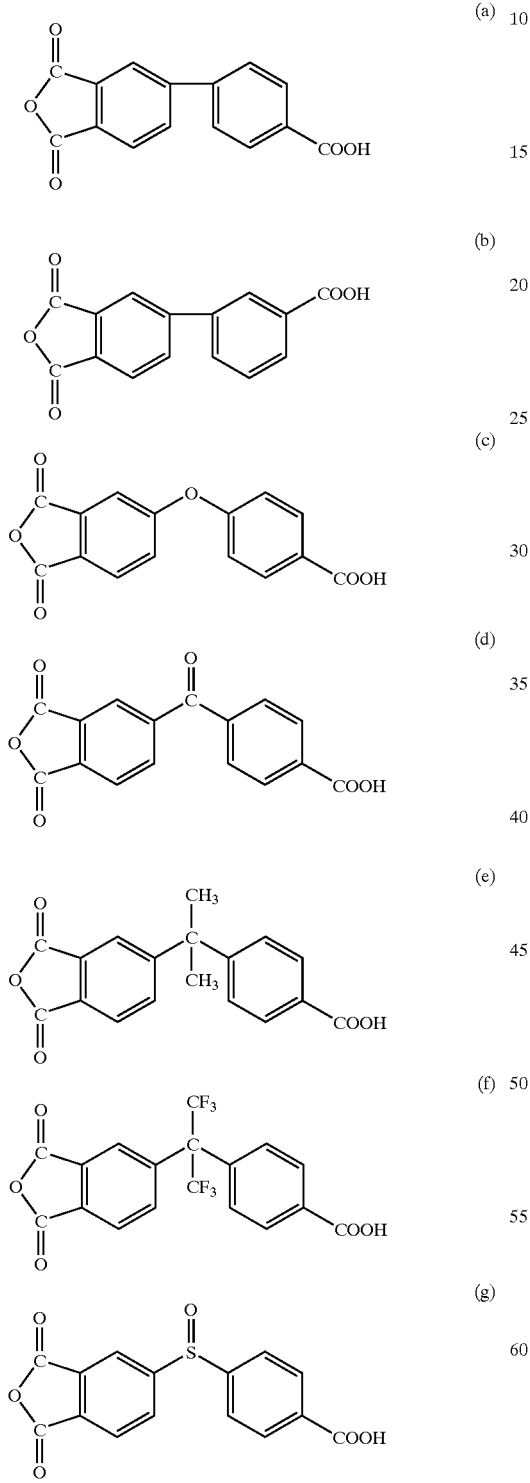

-continued

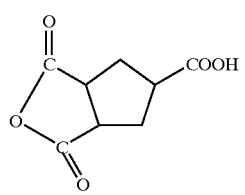
(o)

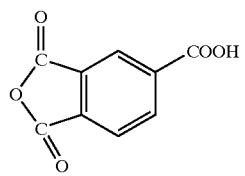
(p)

Also, polyamide, as shown in formula IV:

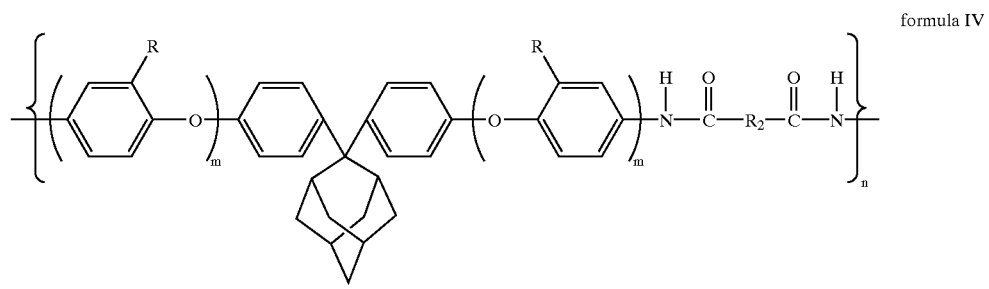
formula IV (wherein R represents alkyl of 1 to 5 carbon atoms or alkyl fluoride of 1 to 5 carbon atoms, such as H, CH$_3$ and CF$_3$, etc., and m is 0,1 or 2). It is the product of reacting 2,2-Bis-(4-aminophenyl)adamantane) (formula I) as diamine with diacid. Diacid is selected from the group comprising aromatic diacid and aliphatic diacid, such as:

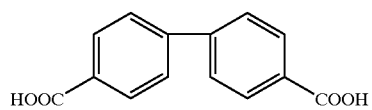
(a)

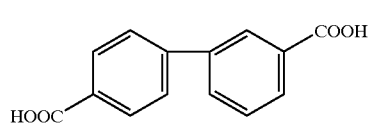
(b)

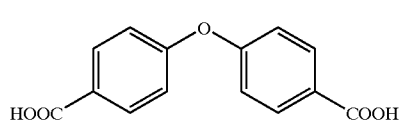
(c)

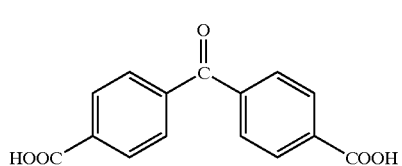
(d)

-continued

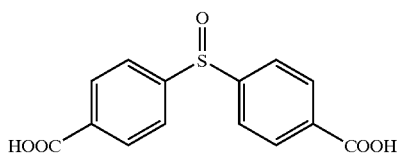
(e)

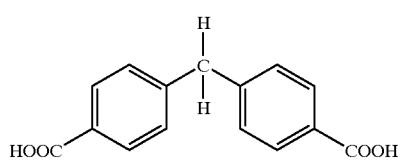
(f)

-continued

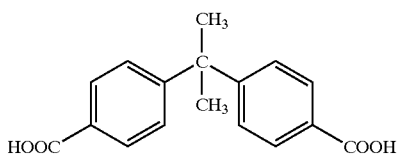
(g)

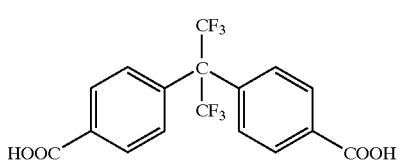
(h)

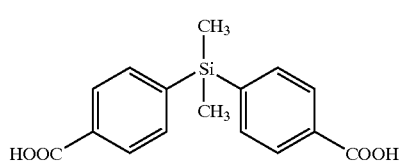
(i)

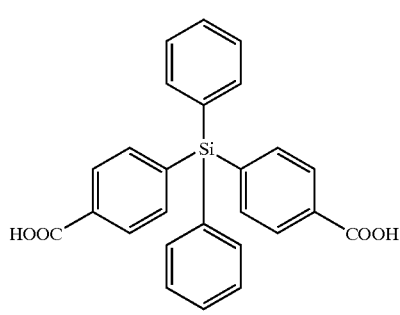
(j)

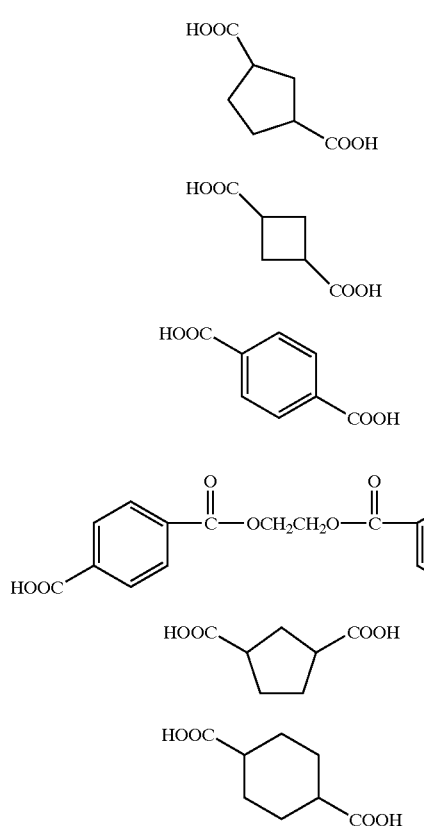
For the above polymers, 2,2-Bis-(4-aminophenyl) adamantane) is mainly as used as diamine. However, other diamine could also be used in combination with the admantane derivative. The 2,2-Bis-(4-aminophenyl)adamantane is preferably 10%~99% of the diamine used, and the examples of the other diamines are as follows:
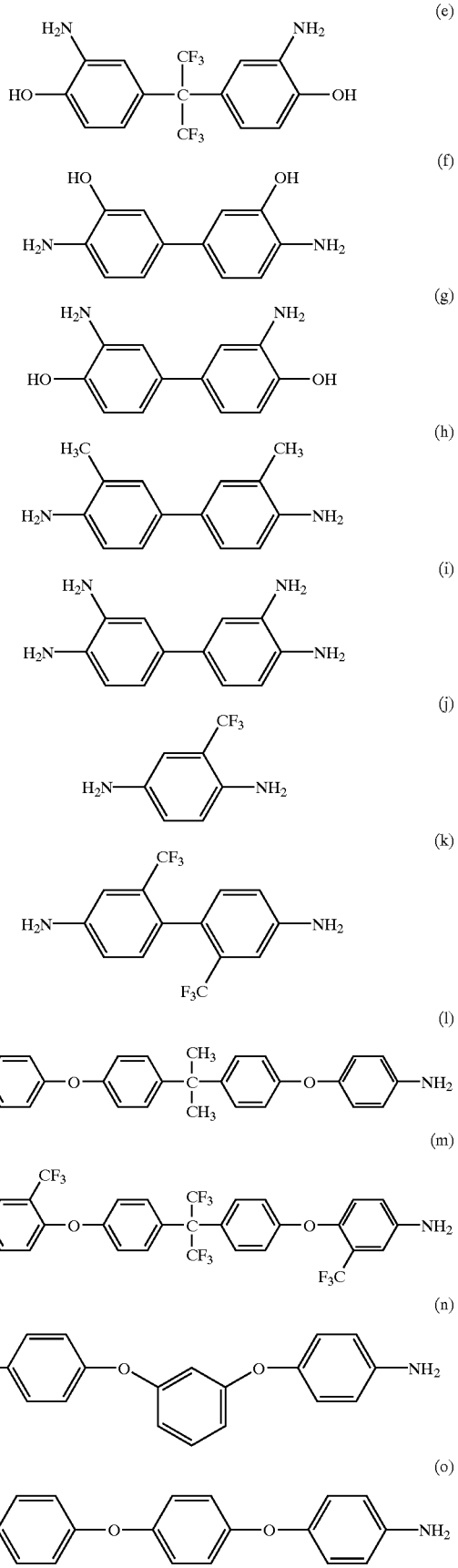

-continued

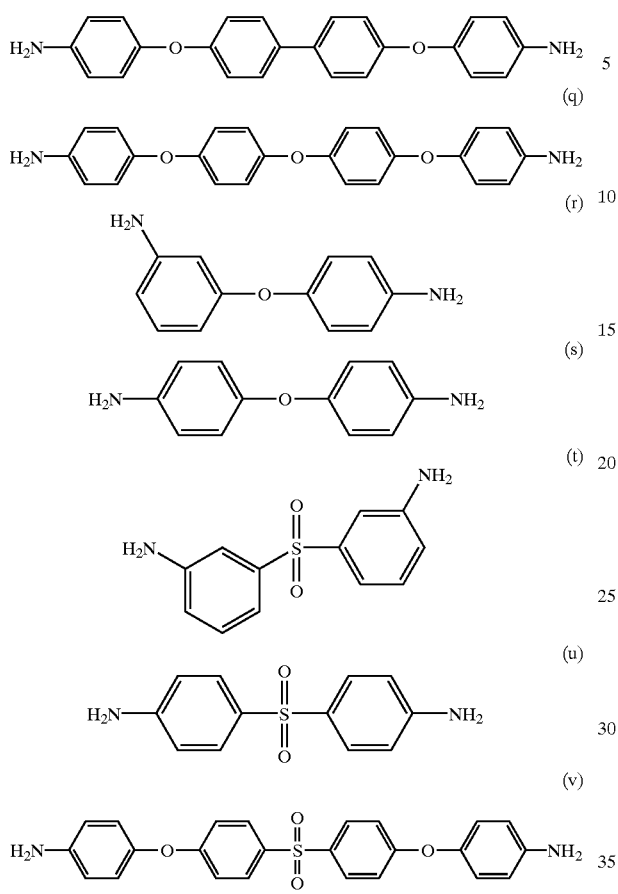

For all three polymers, the molar ratio of dianhydride, acid anhydride and diacid to diamine must be between 0.8 and 1.2 so that the obtained high molecular polymers have constant molecular weight and strength, consequently the requirements of the polymers are met. The closer the molar ratio is to 1, the greater the molecular weight is, which also induces high viscosity.

If the molar ratio is not equal to 1, a suitable end cap functional group can be added to cover the difference and this will decrease oxidation or dark colouring caused by molar ratio being not equal to 1. The end cap functional group is preferably selected from phthalic anhydrice, maleic anhydride, aniline and cyclohexyl amine, etc.

Take the polymerization reaction of polyimide for example, nitrogen gas is passed to a stirrer reactor for 10 minutes, then it is pumped out. Repeat these steps three times to get rid of the moisture and oxygen in the reactor. Diamine is then added, and disolved by solvents. Stir for 30 minutes, then dianhydride is added in three batches to increase molecular weight and viscosity. The total number of moles is 0.8 to 1.2 times (molar ratio) that of diamine. At this point, a small quantity of catalyst, such as TEA, can be added to increase molecular weight. The temperature is controlled at a certain temperature. In general, the higher the temperature is, the higher the reactivity, the same goes for viscosity and molecular weight. The reaction time is from 3 minutes to 48 hours. After completion, polyimide of polymerization degree of 10~5000, and molecular weight of 2000~2000000 is obtained. NMP solvent is added to dilute the polymer to reach an appropriate solid content and viscosity, so that precursor of wide viewing angle film with an appropriate film thickness after baking is fulfilled.

The same procedures apply to the polymerization of polyamide imide, the only difference being that acid anhydride is used in place of dianhydride. As for polyamide, diacid is used instead of dianhydride. The rest is the same.

The following is a further explanation of the manufacturing processes of high molecular polymers of the invention and the test results of the wide viewing angle films obtained with reference to preferred embodiments.

EXAMPLE 1

3.78 g of 2,2-Bis(4-aminophenyl)adamantane was dissolved in 40 ml of m-Cresol. After it completely dissolved, 3.12 g of 3,3'4,4'-biphenyl tetracarboxylic dianhydride (BPDA) was added to react at room temperature for 6 hours. Then 2 ml of Isoquinoline was added, increasing temperature and causing a reflux reaction for 12 hours. It was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 2

3.78 g of 2,2-Bis(4-aminophenyl)adamantane was dissolved in 40 ml of m-Cresol. After it completely dissolved, 2.31 g of pyromellitic dianhydride (PMDA) was added to react at room temperature for 6 hours. Then 2 ml of isoquinoline was added, increasing temperature and causing reflux reaction for 12 hours, it was then cooled to 70° C. The product was poured into ethanone and precipitated. After the precipitate was washed with ethanone and water thoroughly, it was dried and dissolved in solvent NMP to become 10%. By the spinning coating process, the obtained high molecular polymer was coated on a substrate. After prebaking, high temperature baking and cooling, it was subjected to phase retardation and transmittance tests. The results are shown in Table 1.

EXAMPLE 3

3.78 g of 2,2-Bis(4-aminophenyl)adamantane was dissolved in 40 ml of m-Cresol. After it completely dissolved, 4.71 g of 2,2'-bis-(3,4-dicarboxyphenyl)hexafluoropropane dianhydride (6FDA) was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 4

3.78 g of 2,2-Bis(4-aminophenyl)adamantane was dissolved in 40 ml of m-Cresol. After it completely dissolved, 2.38 g of 2,3,5-tricarboxylcyclopentyl, acetic acid dianhydride was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%. By the spinning coating process, the obtained high molecular polymer was coated on a substrate. After prebaking, high temperature baking and cooling, it was subjected to phase retardation and transmittance tests. The results are shown in Table 1.

EXAMPLE 5

1.89 g of 2,2-Bis(4-aminophenyl)adamantane and 3.10 g of 4,4"-bis(4-aminophenoxy)-biphenyl were dissolved in 40 ml of m-Cresol. After they completely dissolved, 3.12 g of 3,3'4,4'-biphenyl tetracarboxylic dianhydride (BPDA) was added to react at room temperature for 3 hours. Then 2 ml of isoquinoline was added, increasing temperature and causing a reflux reaction for 6 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 6

2.26 g of 2,2-Bis(4-aminophenyl)adamantane and 1.96 g of 1,3'-bis(4-aminophenoxy)-benzene were dissolved in 40 ml of m-Cresol. After they completely dissolved, 2.31 g of PMDA was added to react at room temperature for 3 hours. Then 2 ml of isoquinoline was added, increasing temperature and causing a reflux reaction for 6 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 7

3.78 g of 2,2-Bis(4-aminophenyl)adamantane was heated until completely dissolved, then 3.12 g of 3,4'-biphenyl acetic diacid was added to react at 250° C. for 1 hour. Then the pressure was decreased by pumping and became less than 0.05 torr, and reacted at 300° C. for 4 hours. It was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 8

3.705 g of 2,2-Bis[(2-trifluoromethyl-4-aminophenyloxy)phenyl]adamantane was dissolved in 32 ml of m-Cresol. After it completely dissolved, 1.707 g of 3,3'4,4'-biphenyl tetracarboxylic dianhydride (BPDA) was added to react at room temperature for 6 hours. Then 2 ml of Isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 9

3.705 g of 2,2-Bis[(2-trifluoromethyl-4-aminophenyloxy)phenyl]adamantane was dissolved in 32 ml of m-Cresol. After it completely dissolved, 1.26 g of PMDA was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 10

3.705 g of 2,2-Bis[(2-trifluoromethyl-4-aminophenyloxy)phenyl]adamantane was dissolved in 32 ml of m-Cresol. After it completely dissolved, 3.58 g of 6FDA was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 11

3.705 g of 2,2-Bis[(2-trifluoromethyl-4-aminophenyloxy)phenyl]adamantane was dissolved in 32 ml of m-Cresol. After it completely dissolved, 1.30 g of 2,3,5-tricarboxylcyclopentyl acetic acid dianhydride was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 12

3.705 g of 2,2-Bis[(2-trifluoromethyl-4-aminophenyloxy)phenyl]adamantane and 3.10 g of 4,4'-bis-(4-aminophenyloxy)-biphenyl were dissolved in 32 ml of m-Cresol. After they completely dissolved, 1.707 g of 3,3'4,4'-biphenyl tetracarboxylic dianhydride (BPDA) was added to react at room temperature for 3 hours. Then 2 ml of isoquinoline was added, increasing temperature and causing a reflux reaction for 6 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 13

1.15 g of 2,2-Bis[(2-trifluoromethyl-4-aminophenyloxy) phenyl]adamantane and 1.96 g of 1,3'-bis-(4-aminophenyloxy)phenyl were dissolved in 32 ml of m-Cresol. After they completely dissolved, 1.26 g of PMDA was added to react at room temperature for 3 hours. Then 2 ml of isoquinoline was added, increasing temperature and causing a reflux reaction for 6 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 14

3.705 g of 2,2-Bis[(2-trifluoromethyl-4-aminophenyloxy) phenyl]adamantane was heated until completely dissolved, then 3.12 g of 3,4'-biphenyl acetic diacid was added. The mixture reacted at 250° C. for 1 hour, then the pressure was reduced by pumping to less than 0.05 torr and react at 300° C. for 4 hours. It was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 15

3.125 g of 2,2-Bis[(2-trifluoromethyl-4-aminophenyloxy) phenyl]adamantane was dissolved in 30 ml of m-Cresol. After it completely dissolved, 1.73 g of 3,3'4,4'-biphenyl tetracarboxylic dianhydride (BPDA) was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 16

3.125 g of 2,2-Bis[(2-trifluoromethyl-4-aminophenyloxy) phenyl]adamantane was dissolved in 30 ml of m-Cresol. After it completely dissolved, 1.28 g of PMDA was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in chloroform to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 17

3.125 g of 2,2-Bis[(2-trifluoromethyl-4-aminophenyloxy) phenyl]adamantane was dissolved in 30 ml of m-Cresol. After it completely dissolved, 2.61 g of 6FDA was added to react at room temperature for 12 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent O-Chlorophenol to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 18

3.125 g of 2,2-Bis[(2-trifluoromethyl-4-aminophenyloxy) phenyl]adamantane was dissolved in 30 ml of m-Cresol. After it completely dissolved, 1.32 g of 2,3,5-tricarboxylcyclopentyl acetic acid dianhydride was added to react at room temperature for 12 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 19

1.56 g of 2,2-Bis[(2-trifluoromethyl-4-aminophenyloxy) phenyl]adamantan and 3.10 g of 4,4'-bis-(4-aminophenyloxy)-biphenyl were dissolved in 30 ml of m-Cresol. After they completely dissolved, 1.73 g of 3,3'4, 4'-biphenyl tetracarboxylic dianhydride (BPDA) was added to react at room temperature for 3 hours. Then 2 ml of Isoquinoline was added, increasing temperature and causing a reflux reaction for 6 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 20

1.13 g of 2,2-Bis[(2-trifluoromethyl-4-aminophenyloxy) phenyl]adamantane and 1.96 g of 1,3'-bis-(4-aminophenyloxy)-phenyl were dissolved in 32 ml of m-Cresol. After they completely dissolved, 1.28 g of PMDA was added to react at room temperature for 3 hours. Then 2 ml of isoquinoline was added, increasing temperature and causing a reflux reaction for 6 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

EXAMPLE 21

3.125 g of 2,2-Bis[(2-trifluoromethyl-4-aminophenyloxy) phenyl]adamantane was heated until completely dissolved, then 3.12 g of 3,4'-biphenyl acetic diacid was added. The mixture reacted at 250° C. for 1 hour, the pressure was reduced by pumping to less than 0.05 torr and reacted at 300° C. for 4 hours. It was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

Comparative Example 1

1.82 g of p-phenylene diamine (PPD) was dissolved in 40 ml of m-Cresol. After it completely dissolved, 3.12 g of BPDA was added to react at room temperature for 3 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

Comparative Example 2

6.20 g of 4,4-Bis(4-aminophenyl)biphenyl (BAPB) was dissolved in 40 ml of m-Cresol. After it completely dissolved, 2.31 g of PMDA was added to react at room temperature for 6 hours. Then 2 ml of isoquinoline was added, increasing temperature and causing a reflux reaction for 12 hours, it was then cooled to 70° C. The product was poured into ethanone and precipitated. After the precipitate was washed with ethanone and water thoroughly, it was dried and dissolved in solvent NMP to become 10%.

By the spinning coating process, the obtained high molecular polymer was coated on a substrate. After prebaking, high temperature baking and cooling, it was subjected to phase retardation and transmittance tests. The results are shown in Table 1.

TABLE 1

| | Phase Retardation (tilt 50°) | | | | transmittance | |
|---|---|---|---|---|---|---|
| | 400 nm | 500 nm | 600 nm | 700 nm | (%) | Notes |
| Example 1 | 141 | 140 | 139 | 138 | 93 | Color ok |
| Example 2 | 135 | 134 | 133 | 132 | 93 | Color ok |
| Example 3 | 118 | 117 | 116 | 115 | 95 | Color ok |
| Example 4 | 92 | 90 | 89 | 88 | 95 | Color ok |

TABLE 1-continued

| | Phase Retardation (tilt 50°) | | | | transmittance | |
|---|---|---|---|---|---|---|
| | 400 nm | 500 nm | 600 nm | 700 nm | (%) | Notes |
| Example 5 | 152 | 151 | 150 | 149 | 93 | Color ok |
| Example 6 | 140 | 139 | 138 | 137 | 94 | Color ok |
| Example 7 | 122 | 121 | 120 | 119 | 92 | Color ok |
| Example 8 | 152 | 151 | 150 | 149 | 93 | Color ok |
| Example 9 | 145 | 144 | 143 | 142 | 93 | Color ok |
| Example 10 | 126 | 125 | 124 | 123 | 93 | Color ok |
| Example 11 | 62 | 61 | 60 | 59 | 93 | Color ok |
| Example 12 | 168 | 167 | 166 | 165 | 93 | Color ok |
| Example 13 | 146 | 145 | 144 | 143 | 93 | Color ok |
| Example 14 | 130 | 129 | 128 | 127 | 92 | Color ok |
| Example 15 | 151 | 150 | 149 | 148 | 93 | Color ok |
| Example 16 | 142 | 141 | 140 | 139 | 93 | Color ok |
| Example 17 | 125 | 124 | 123 | 122 | 93 | Color ok |
| Example 18 | 60 | 59 | 58 | 57 | 93 | Color ok |
| Example 19 | 165 | 164 | 163 | 162 | 93 | Color ok |
| Example 20 | 143 | 142 | 141 | 140 | 93 | Color ok |
| Example 21 | 128 | 127 | 126 | 125 | 92 | Color ok |
| Comparative Example 1 | 150 | 149 | 148 | 147 | 88 | yellowish |
| Comparative Example 2 | 132 | 131 | 130 | 129 | 86 | yellowish |

According to the results in Table 1, the optical compensatory films made of the polymers of the invention have greater transmittance and they all reach the general standard of 92%. The colourings are also normal. On the contrary, in comparative examples 1 and 2, lower transmittance and yellowish colour were obtained. Therefore, the invention obviously has better results than any prior art. As for the test data of phase retardation, it shows that the optical compensatory films of the invention do have negative birefringence effects and are able to achieve wide viewing angle.

The foregoing description of the preferred embodiments of this invention has been presented for purpose of illustration and description. Obvious modifications or variations are possible in light of the above information. The embodiments were chosen and described to provide the best illustration of the principles of this invention and its practical application to thereby enable those skilled in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A polymer for optical compensatory films for display panels, comprising the following repeating unit:

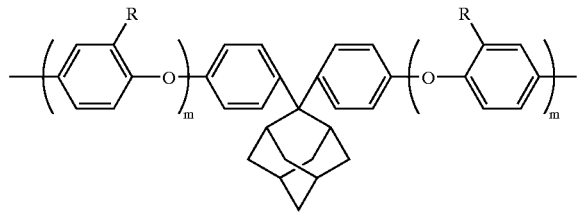

wherein, m is 0, 1 or 2; R represents H, alkyls of 1 to 5 carbon atoms or alkyl fluoride of 1 to 5 carbon atoms, the repeating unit further comprising:

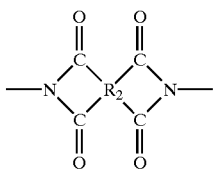
forming:
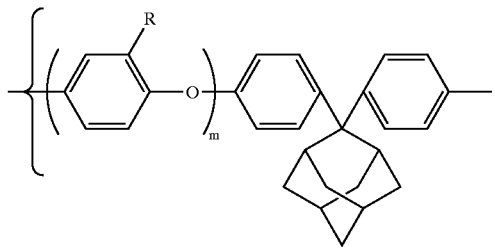
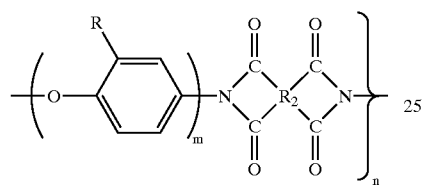
wherein n is a positive integar and $R_2$ represents the following groups:
(a) 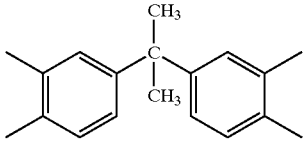
(b) 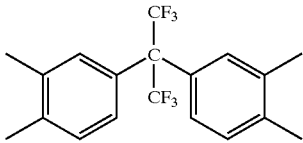
(c) 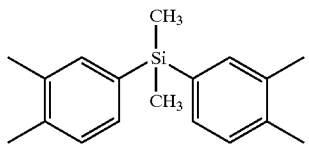
(d), (e), (f) 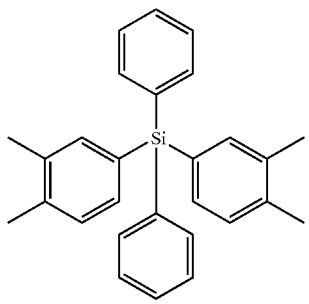
(g) 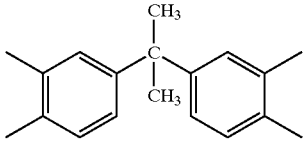
(h), (i), (j) 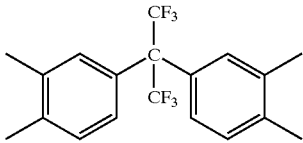
(k) 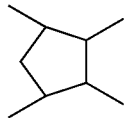
(l) 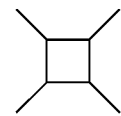
(m) 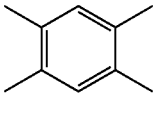
(n) 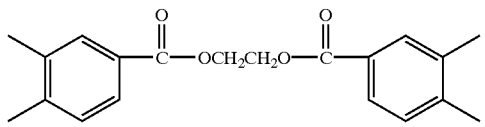
(o) 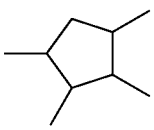
(p) 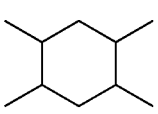
2. The polymer as claimed in claim 1, wherein the polymer is copolymerized by dianhydride and diamine, the molar ratio between them ranges from 0.8 to 1.2.

3. The polymer as claimed in claims 1, wherein the molecular weight of the polymer is between 2000 and 2000000.

4. The polymer as claimed in claim 1, wherein the refractive index difference is between −0.001 and −0.2.

5. A polymer for optical compensatory films for display panels, comprising the following repeating unit:

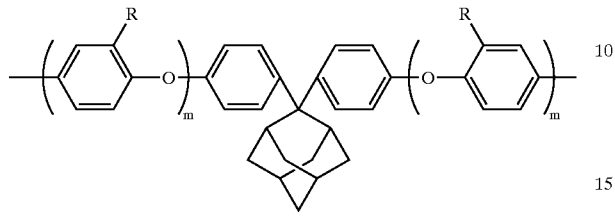

wherein, m is 0, 1 or 2; R represents H, alkyls of 1 to 5 carbon atoms or alkyl fluoride of 1 to 5 carbon atoms, the repeating unit further comprising:

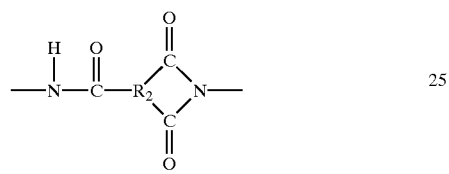

forming:

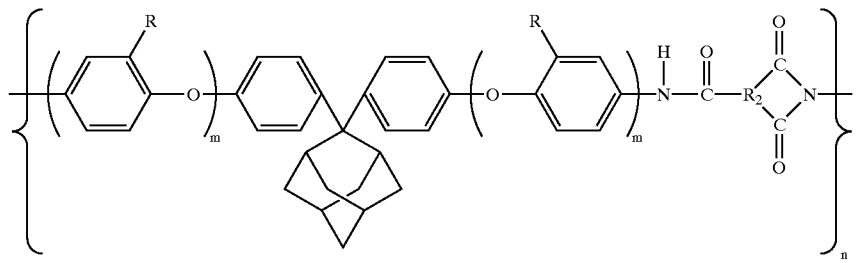

wherein n is a positive integer and $R_2$ represents the following groups:

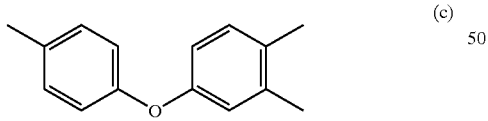
(c)

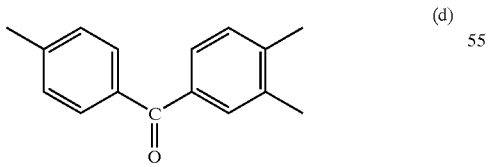
(d)

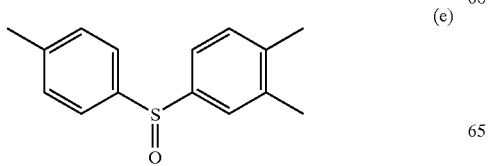
(e)

-continued

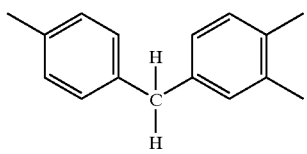
(f)

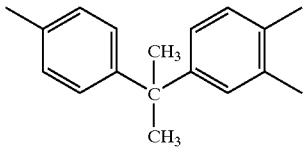
(g)

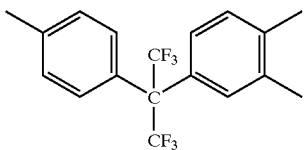
(h)

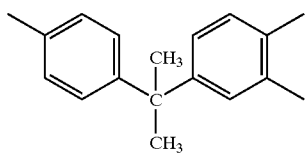
(i)

-continued

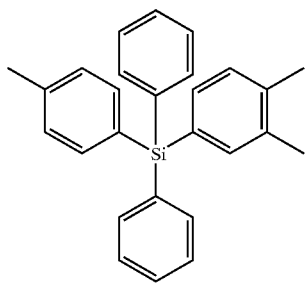
(j)

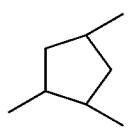
(k)

-continued

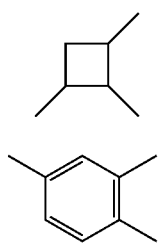

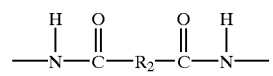

forming:

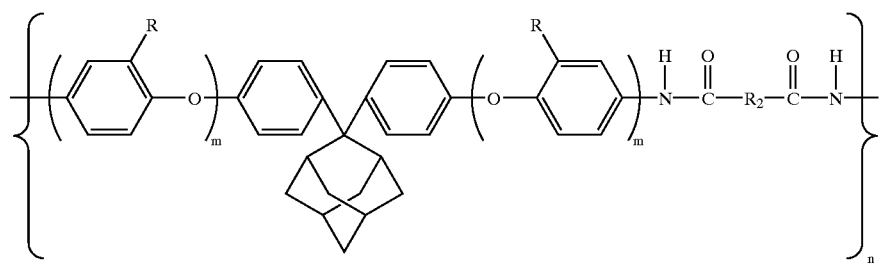

-continued

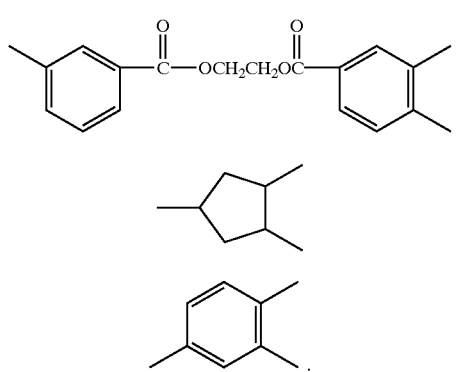

6. The polymer as claimed in claim 5, wherein the polymer is copolymerized by acid anhydride and diamine, the molar ratio of acid anhydride to diamide ranges from 0.8 to 1.2.

7. The polymer as claimed in claim 5, wherein the molecular weight of the polymer is between 2000 and 2000000.

8. The polymer as claimed in claim 5, wherein the refractive index difference is between −0.001 and −0.2.

9. A polymer for optical compensatory films for display panels, comprising the following repeating unit:

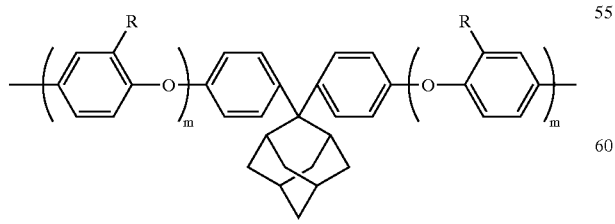

wherein, m is 0, 1 or 2; R represents H, alkyls of 1 to 5 carbon atoms or alkyl fluoride of 1 to 5 carbon atoms, the repeating unit further comprising:

wherein n is a positive integer and $R_2$ represents the following groups:

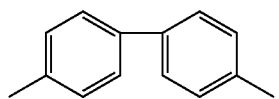

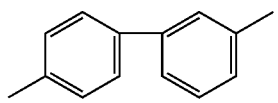

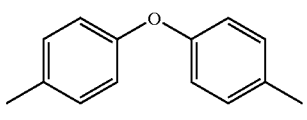

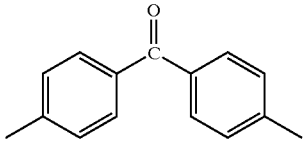

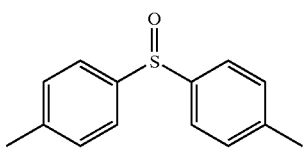

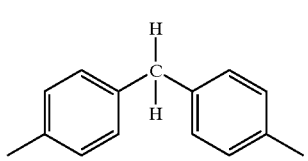

-continued
(g) 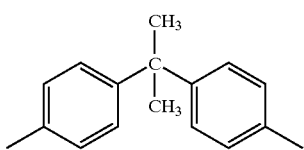
(h) 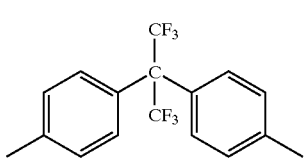
(i) 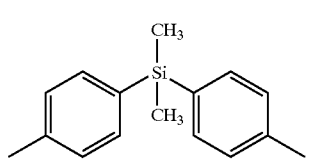
(j) 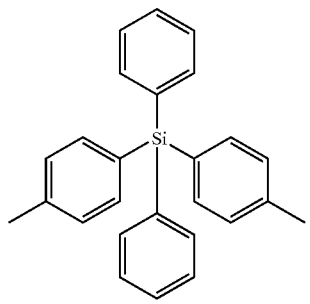
(k) 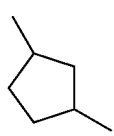
-continued
(l) 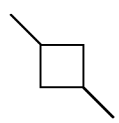
(m) 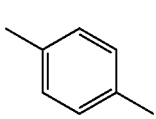
(n) 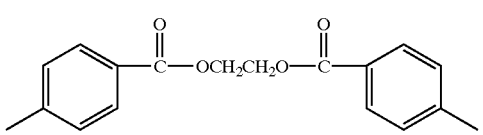
(o) 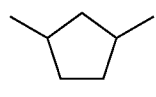
(p) 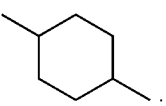
10. The polymer as claimed in claim 9, wherein the polymer is copolymerized by diacid and diamine, the molar ratio of diacid to diamide ranges from 0.8 to 1.2.
11. The polymer as claimed in claim 9, wherein the molecular weight of the polymer is between 2000 and 2000000.
12. The polymer as claimed in claim 9, wherein the refractive index difference is between −0.001 and −0.2.
* * * * *